US012739056B2

(12) United States Patent
Corlay et al.

(10) Patent No.: US 12,739,056 B2
(45) Date of Patent: Sep. 15, 2026

(54) METHOD AND TRANSMITTER FOR TRANSMITTING DATA USING CONSTELLATION

(71) Applicant: MITSUBISHI ELECTRIC CORPORATION, Tokyo (JP)

(72) Inventors: Vincent Corlay, Rennes (FR); Cristina Ciochina-Duchesne, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/843,624

(22) PCT Filed: Sep. 2, 2022

(86) PCT No.: PCT/JP2022/033813

§ 371 (c)(1), (2) Date: Sep. 3, 2024

(87) PCT Pub. No.: WO2023/199536

PCT Pub. Date: Oct. 19, 2023

(65) Prior Publication Data

US 2025/0167916 A1 May 22, 2025

(30) Foreign Application Priority Data

Apr. 13, 2022 (EP) .................................... 22305529

(51) Int. Cl.
*H04L 1/00* (2006.01)
*H04L 27/04* (2006.01)

(52) U.S. Cl.
CPC .......... *H04L 1/0042* (2013.01); *H04L 1/0061* (2013.01); *H04L 27/04* (2013.01)

(58) Field of Classification Search
CPC ....... H04L 1/16; H04L 1/0061; H04L 1/0042; H04L 27/06; H04L 27/04
See application file for complete search history.

(56) References Cited

U.S. PATENT DOCUMENTS 6,891,896 B1 * 5/2005 Betts .................. H04L 27/3488 375/264
7,831,887 B2 * 11/2010 Joyce ................ H03M 13/1185 714/776

(Continued)

FOREIGN PATENT DOCUMENTS

JP 2021-141575 A 9/2021
WO WO 2017/051583 A1 3/2017

OTHER PUBLICATIONS

Aoudia et al., "Joint Learning of Probabilistic and Geometric Shaping for Coded Modulation Systems", arxiv.org, Cornell University Library, 201 Olin Library Cornell University, Ithaca, NY 14853, Apr. 2020, XP081641910, Sections I, II, total 6 pages.

(Continued)

*Primary Examiner* — Esaw T Abraham
(74) *Attorney, Agent, or Firm* — Birch, Stewart, Kolasch & Birch, LLP

(57) ABSTRACT

A method is disclosed for transmitting data using a constellation with $M=2^m$ symbols, divided in N sub-constellations, N and M being integers, where for any symbol in a reference sub-constellation, there is a symbol in each of the other sub-constellations with a same probability value. The method includes obtaining from a source of data, k groups of $m-\log_2(N)$ shaping bits wherein each group of $m-\log_2(N)$ shaping bits identifies one symbol $x_j$ in the reference sub-constellation, $j\in[1;k]$; applying a systematic error correcting code on said k groups of $m-\log_2(N)$ shaping bits to output one group of $\log_2(N)$ parity bits per each symbol $x_j$; for each symbol $x_j$, identifying a sub-constellation using at least the group of $\log_2(N)$ parity bits and selecting a symbol identified by said $m-\log_2(N)$ shaping bits in said identified sub-constellation; and transmitting each of said k selected symbols to a receiver over a communication channel.

16 Claims, 6 Drawing Sheets

(56) References Cited

U.S. PATENT DOCUMENTS

| | | | | |
|---|---|---|---|---|
| 10,091,046 | B1 * | 10/2018 | Lefevre | H04L 27/36 |
| 10,200,231 | B1 * | 2/2019 | Lefevre | H04L 27/3411 |
| 10,819,371 | B2 * | 10/2020 | Park | H03M 13/6552 |
| 10,868,706 | B2 * | 12/2020 | Loghin | H04L 27/38 |
| 10,972,215 | B2 * | 4/2021 | Cho | H04B 10/808 |
| 11,265,017 | B2 * | 3/2022 | Park | H04L 1/0042 |
| 11,838,123 | B2 * | 12/2023 | Ebrahimzad | H04L 1/0041 |
| 2020/0344105 | A1 * | 10/2020 | Stadelmeier | H04L 1/007 |
| 2022/0006532 | A1 * | 1/2022 | Elzanaty | H04B 10/503 |

OTHER PUBLICATIONS

Bocherer et al., "Bandwidth Efficient and Rate-Matched Low-Density Parity-Check Coded Modulation", IEEE Transactions on Communications, IEEE Service Center, Piscataway, NJ, USA, vol. 63, No. 12, Dec. 2015, pp. 4651-4665.

International Search Report for PCT/JP2022/033813 mailed on Nov. 29, 2022.

Written Opinion of the International Searching Authority for PCT/JP2022/033813 mailed on Nov. 29, 2022.

Japanese Office Action for Japanese Application No. 2024-560966, dated Apr. 15, 2025, with English translation.

* cited by examiner

METHOD AND TRANSMITTER FOR TRANSMITTING DATA USING CONSTELLATION

TECHNICAL FIELD

At least one of the present embodiments generally relates to a method, in a transmitter, for transmitting data to a receiver over a communication channel. At least one embodiment relates to a transmitter configured to implement the method.

BACKGROUND ART

In a communication system, a transmitter is coupled to a receiver by way of a communication channel (e.g. an optical fiber). The transmitter usually comprises an encoder configured to encode the input data, e.g. a bitstream, into symbols belonging to a finite set, called a constellation. One dimensional ASK (English acronym of "Amplitude-Shift Keying") and two dimensional QAM (English acronym of "Quadrature-Amplitude Keying") are examples of such constellations. Here, one dimensional or two dimensional constellations mean that the symbols take value in R or in $R^2$, respectively, R being the set of real numbers. These symbols are then transmitted over the communication channel to the receiver. The receiver comprises a decoder configured to decode the received symbols into output data.

Communication systems in which uniformly distributed symbols are transmitted usually lead to an absence of a shaping gain. Therefore, in order to approach the channel capacity, it is known that the transmitter should process the input data to change the probability distribution of the transmitted symbols. More precisely, the input data are processed so that the transmitted symbols have a non-uniform probability distribution that is adapted to the communication channel. This operation, called probabilistic shaping, can provide energy savings also known as shaping gain.

In addition to shaping, the signal should be protected against errors with a so-called error-correcting code. Combining shaping and error-correcting code is complex.

The document from Böcherer et al entitled "*Bandwidth Efficient and Rate-Matched Low-Density Parity-Check Coded Modulation*" and published in IEEE transactions on communications, vol. 63, no. 12, December 2015 discloses a new coded modulation scheme that, at the transmitter, combines a distribution matcher for probabilistic shaping with a systematic error-correcting code. This method requires that the parity bit of the error-correcting code has an equiprobable distribution and is thus well-suited to the shaping of symmetric distributions as the symbols have the same probability to be positive or negative. However, it is not adapted to the shaping of non-symmetric distributions. In addition, this method is not compliant with distribution matchers that consider the sign bits as shaping bits and therefore change the conditional distribution of the sign bit which is no more independent of the value of the other bits.

It is thus desirable to find a method for transmitting data that is adapted to non-symmetric distributions and that makes it possible to use distribution matchers which consider the sign bits as shaping bits.

SUMMARY OF INVENTION

At least one of the present embodiments generally relates to a method, in a transmitter, for transmitting data using a constellation with $M=2^m$ symbols, divided in N sub-constellations, N and M being integers, where for any symbol in a reference sub-constellation, there is a symbol in each of the other sub-constellations with a same probability value. The method comprises:

- obtaining from a source of data, k groups of $m-\log_2(N)$ shaping bits wherein each group of $m-\log_2(N)$ shaping bits identifies one symbol $x_j$ in the reference sub-constellation, $j\in[1;k]$;
- applying a systematic error correcting code on said k groups of $m-\log_2(N)$ shaping bits to output one group of $\log_2(N)$ parity bits per each symbol $x_j$;
- for each symbol $x_j$, identifying a sub-constellation using at least the group of $\log_2(N)$ parity bits and selecting a symbol identified by said $m-\log_2(N)$ shaping bits in said identified sub-constellation; and
- transmitting each of said k selected symbols to a receiver over a communication channel.

This method is compliant with distribution matchers that consider the sign bits as shaping bits. In addition, it is also adapted to non-symmetric distributions.

In one embodiment, obtaining from a source of data, k groups of $m-\log_2(N)$ shaping bits wherein each group of $m-\log_2(N)$ shaping bits identifies one symbol $x_j$ in the reference sub-constellation, $j\in[1;k]$ comprises:

- applying a distribution matcher on said data of said source to obtain k symbols $x_j$ in the reference sub-constellation; and
- labelling each symbol with a group of $m-\log_2(N)$ shaping bits using a labelling function.

In one embodiment, the labelling function is a natural labelling function.

In one embodiment, the labelling function is a Gray labelling function.

In one embodiment, wherein N=2, identifying, for each symbol $x_j$, a sub-constellation using at least the group of $\log_2(N)$ parity bits and selecting a symbol identified by said $m-\log_2(N)$ shaping bits in said identified sub-constellation comprises: selecting a shift value in the set {0; 2} responsive to at least the group of $\log_2(N)$ parity bits and adding the selected shift value to the symbol $x_j$ of the reference sub-constellation to obtain the symbol to transmit.

In one embodiment, selecting a shift value in the set {0; 2} responsive to at least the group of $\log_2(N)$ parity bits comprises selecting a shift value responsive to double a sum modulo 2 of the group of $\log_2(N)$ parity bits and of the corresponding $m-\log_2(N)$ shaping bits.

In one embodiment, the constellation is a M-ASK constellation.

In one embodiment, wherein said source of data is an equiprobable source.

At least one of the present embodiments generally relates to a transmitter configured to transmit data using a constellation with $M=2^m$ symbols, divided in N sub-constellations, N and M being integers, where for any symbol in a reference sub-constellation, there is a symbol in each of the other sub-constellations with a same probability value. The transmitter comprises at least one processor configured to:

- obtain from a source of data, k groups of $m-\log_2(N)$ shaping bits wherein each group of $m-\log_2(N)$ shaping bits identifies one symbol $x_j$ in the reference sub-constellation, $j\in[1;k]$;
- apply a systematic error correcting code on said k groups of $m-\log_2(N)$ shaping bits to output one group of $\log_2(N)$ parity bits per each symbol $x_j$;
- for each symbol $x_j$, identify a sub-constellation using at least the group of $\log_2(N)$ parity bits and select a symbol identified by said $m-\log_2(N)$ shaping bits in said identified sub-constellation; and transmit each of said k selected symbols to a receiver over a communication channel.

In one embodiment, to obtain from a source of data, k groups of $m-\log_2(N)$ shaping bits wherein each group of $m-\log_2(N)$ shaping bits identifies one symbol $x_j$ in the reference sub-constellation, $j\in[1;k]$ comprises:

to apply a distribution matcher on said data of said source to obtain k symbols $x_j$ in the reference sub-constellation; and to label each symbol with a group of $m-\log_2(N)$ shaping bits using a labelling function.

In one embodiment, the labelling function is a natural labelling function.

In one embodiment, the labelling function is a Gray labelling function.

In one embodiment, wherein N=2, to identify, for symbol $x_j$, a sub-constellation using at least the group of $\log_2(N)$ parity bits and to select a symbol identified by said $m-\log_2(N)$ shaping bits in said identified sub-constellation comprises: to select a shift value in the set {0; 2} responsive to at least the group of $\log_2(N)$ parity bits and to add the selected shift value to the symbol $x_j$ of the reference sub-constellation to obtain the symbol to transmit. at least the group of $\log_2(N)$ parity bits and to add the selected shift value to the symbol xj of the reference constellation to obtain the symbol to transmit.

In one embodiment, to select a shift value in the set {0; 2} responsive to at least the group of $\log_2(N)$ parity bits comprises to select a shift value responsive to double a sum modulo 2 of the group of $\log_2(N)$ parity bits and of the corresponding $m-\log_2(N)$ shaping bits.

A computer program product is also disclosed that comprises program code instructions that can be loaded in a programmable device, the program code instructions causing implementation of the method according to any one of the disclosed embodiments when the program code instructions are run by the programmable device.

A storage medium is also disclosed that stores a computer program comprising program code instructions, the program code instructions causing implementation of the method according to any one of the disclosed embodiments when the program code instructions are read from the storage medium and run by a programmable device.

The characteristics of the invention will emerge more clearly from a reading of the following description of at least one example of embodiment, said description being produced with reference to the accompanying drawings.

DESCRIPTION OF EMBODIMENTS

Figure 1:
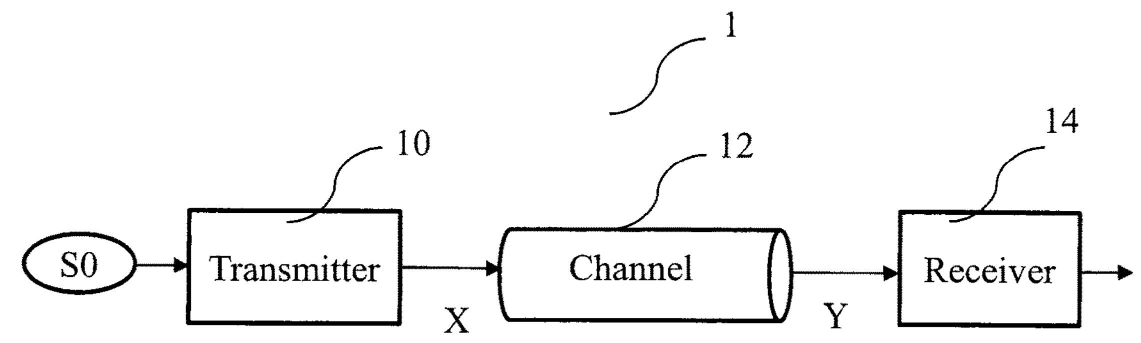
FIG. 1 illustrates schematically a communication system in which the present embodiments may be implemented.

FIG. 1 illustrates schematically a communication system 1 in which the present embodiments may be implemented. The communication system 1 comprises a transmitter 10 and a receiver 14 that are coupled to one another by way of a communication channel 12. The transmitter 10 is fed with input data by at least one binary source S0 and outputs symbols selected in a given alphabet $\mathcal{X}$ of symbols. In one embodiment, the binary source S0 is equiprobable. The input data are for example bits of an audio/video bitstream. In an exemplary embodiment, the alphabet $\mathcal{X}$ is a M-ASK constellation, where $M=2^m$ with M and m being integers. The symbols of a M-ASK constellations are defined as follows:

$$\mathcal{X}=\{-2^m+1, \ldots, -3, -1, +1, +3, \ldots, +2^m-1\}.$$

Figure 2:
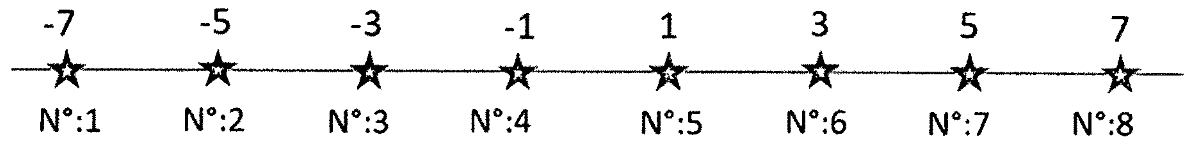
FIG. 2 depicts the symbols of an 8-ASK constellation.

Consequently, each symbol in this constellation can be represented by a sequence of $m=\log_2 M$ bits. FIG. 2 depicts the symbols of an 8-ASK constellation wherein the first symbol is −7 and the last one is 7. In the following, the various embodiments are described with reference to the ASK constellation. It will be appreciated, however, that the present embodiments are not restricted to the ASK constellation. As an example, it may also be used with a one dimensional constellation where the symbols have different values than the one specified in the above equation, such as the one obtained with geometric shaping (in this case geometric and probabilistic shaping would be combined).

With reference to FIG. 1, let X be a discrete random variable representing the symbols at the input of the communication channel 12 with probability distribution $p(x_i)=p(X_i=x_i)$, $x_i\in\mathcal{X}$. Let $p(y|x_i)$ be the channel distribution. e.g. with a Gaussian channel $p(y|x_i)\sim\mathcal{N}(x_i, \sigma^2)$, for all $x_i$. Let Y be a random variable representing the communication channel output. In the case of a Gaussian channel, Y is defined as follows: Y=X+W, where W is a Gaussian noise, e.g. $W \sim \mathcal{N}(0, \sigma^2)$.

For the Gaussian channel, the signal-to-noise ratio (SNR) is defined as follows:

$$SNR = \frac{E[|X|^2]}{E[|W|^2]}$$

Given any communication channel, let p*(x) be the distribution of the input X that maximizes the mutual information (MI) for a given constellation $$p^*(x) = \underset{p(x),\ E[|X|^2] \le P}{\arg\max}\ I(X; Y),$$

where P is the maximum average power. The quantity $$\max_{E[|X|^2] \le P} I(X; Y),$$

where the maximization is not only over the probability distribution but also over all possible inputs, is called the channel capacity. In the following, a discrete input is considered and optimization is only done over its distribution. The constellation (i.e., the set of positions of the elements of the discrete input) is not an optimization variable.

$\widehat{p^*}(x)$ is defined as the set of quasi-optimal distributions, $$\text{i.e. } p(x) \in \widehat{p^*}(x) \text{ if } I(X; Y) \ge \underset{p(x), E[|X|^2] \le P}{\arg\max}\ I(X; Y) - \varepsilon,$$

where ε is a quantity whose magnitude depends on the requirements of the communication systems.

The aim of probabilistic shaping is to process the input such that its probability distribution maximizes, or almost maximizes, the mutual information I(X; Y). Said otherwise, the distribution of the input should be in $\widehat{p^*}$ (x).

Figure 3:
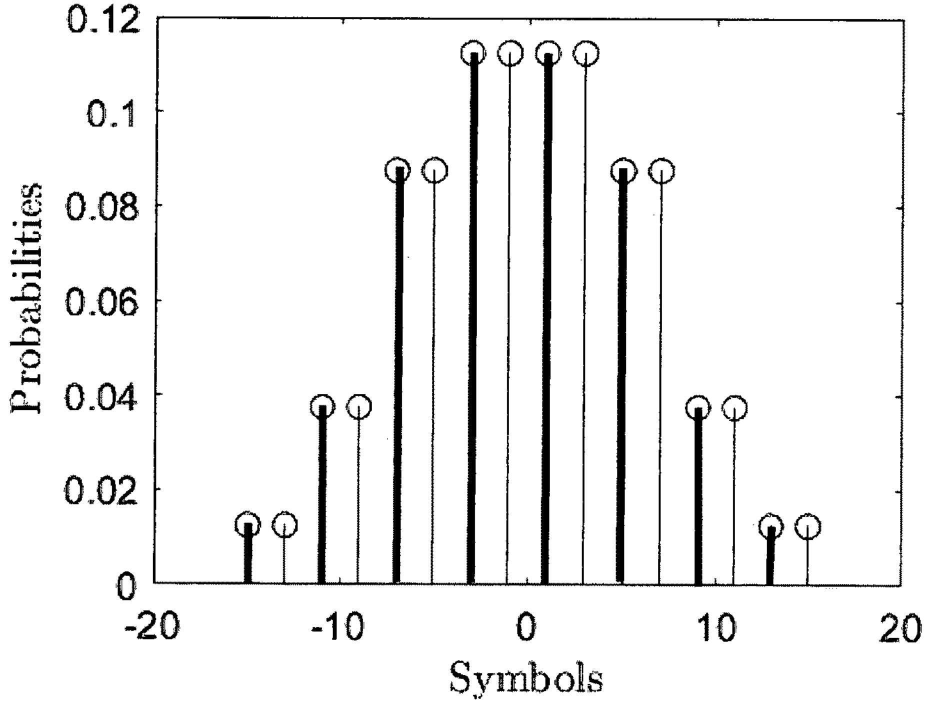
FIG. 3 depicts an example of a quantized target bit distribution of a 16-ASK constellation.

For the M-ASK constellation, p(x) is often chosen as the MB distribution (English acronym of “Maxwell-Boltzmann distribution”). Indeed, in this case, the obtained performance is close to the one obtained with p*(x) (i.e. $p_{MB}(x) \in \widehat{p^*}(x)$ for E small). The MB distribution can be quantized at the cost of negligible performance loss. As an example, a quantized distribution for a 16-ASK constellation as illustrated on FIG. 3 exhibits quasi-optimal performance and thus can be used as a target shaping distribution.

According to the present principles, the target shaping distribution is quantized such that it can be expressed as the union of at least two sub-constellations where, for any symbol with a given probability value pi in the first sub-constellation, there is a symbol in the other sub-constellation with the same probability value pi. The first sub-constellation is called the reference sub-constellation and its distribution the reference distribution. On FIG. 3, the distribution of the reference sub-constellation is identified with bold lines.

In one embodiment, the target shaping distribution is quantized such that two adjacent symbols have the same probability value. This is the case of the distribution illustrated on FIG. 3. For the M=16-ASK constellation, $\log_2(M)$= 4 bits are required for the labelling of the symbols. In one embodiment, the natural labelling of the symbols in this constellation is used and provided by the following table 1.

TABLE 1

| Symbols | −15 | −13 | −11 | −9 | −7 | −5 | −3 | −1 | 1 | 3 | 5 | 7 | 9 | 11 | 13 | 15 |
|---|---|---|---|---|---|---|---|---|---|---|---|---|---|---|---|---|
| Bit-level 1 ($b_1$) | 0 | 1 | 0 | 1 | 0 | 1 | 0 | 1 | 0 | 1 | 0 | 1 | 0 | 1 | 0 | 1 |
| Bit level 2 ($b_2$) | 0 | 0 | 1 | 1 | 0 | 0 | 1 | 1 | 0 | 0 | 1 | 1 | 0 | 0 | 1 | 1 |
| Bit level 3 ($b_3$) | 0 | 0 | 0 | 0 | 1 | 1 | 1 | 1 | 0 | 0 | 0 | 0 | 1 | 1 | 1 | 1 |
| Bit level 4 ($b_4$) | 0 | 0 | 0 | 0 | 0 | 0 | 0 | 0 | 1 | 1 | 1 | 1 | 1 | 1 | 1 | 1 |

Figure 4:
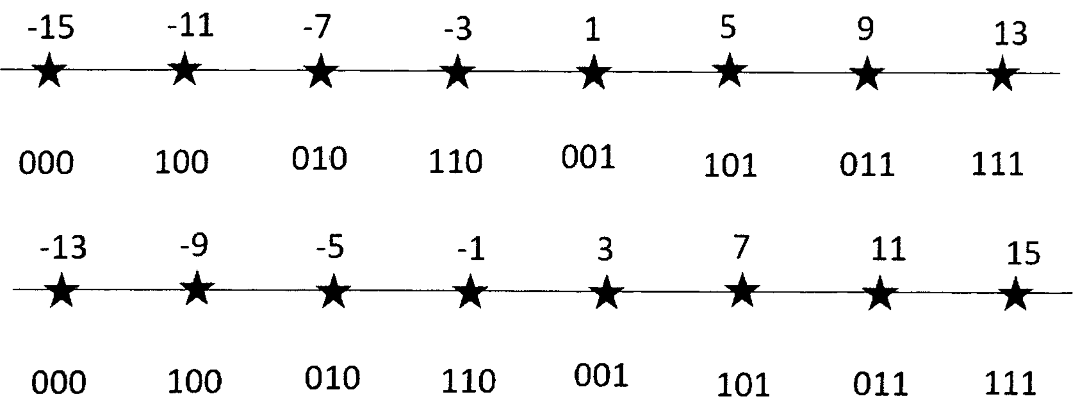
FIG. 4 depicts two sub-constellations of the 16-ASK constellation and a natural labelling of the symbols according to an embodiment.

The bit level 4 is the sign bit and is used as a shaping bit. The first bit level b1 which is the parity bit discriminates between the two sub-constellations as shown on FIG. 4. Indeed, the adjacent symbols with the same probability (according to FIG. 3) have a different value for b1. The symbols of same probability values have the same remaining labelling bits (bit-level 2 to 4), e.g. −15 and −13. Hence, the whole 16-ASK constellation $\mathcal{X}$ may be expressed as the union of a reference sub-constellation $\mathcal{X}_r$ and a shifted version of this reference sub-constellation. The reference sub-constellation $\mathcal{X}_r$ comprises the symbols in grey cells of table 1, i.e. {−15; −11; −7, −3, 1, 5, 9, 13}. The second sub-constellation comprises the other symbols. Said otherwise, $\mathcal{X} = \mathcal{X}_r \cup (\mathcal{X}_r + 2) = \cup_{\alpha_i \in \alpha} \mathcal{X}_r + \alpha_i$, where α={0,2}. Moreover, a transmitted symbol belongs equiprobably to one of the two sub-constellations.

In another embodiment, Gray labelling of the symbols in this constellation is used and provided by the following table 2.

TABLE 2

| Symbols | −15 | −13 | −11 | −9 | −7 | −5 | −3 | −1 | 1 | 3 | 5 | 7 | 9 | 11 | 13 | 15 |
|---|---|---|---|---|---|---|---|---|---|---|---|---|---|---|---|---|
| Bit-level 1 ($b_1$) | 0 | 1 | 1 | 0 | 0 | 1 | 1 | 0 | 0 | 1 | 1 | 0 | 0 | 1 | 1 | 0 |

TABLE 2-continued

| Symbols | −15 | −13 | −11 | −9 | −7 | −5 | −3 | −1 | 1 | 3 | 5 | 7 | 9 | 11 | 13 | 15 |
|---|---|---|---|---|---|---|---|---|---|---|---|---|---|---|---|---|
| Bit level 2 ($b_2$) | 0 | 0 | 1 | 1 | 1 | 1 | 0 | 0 | 0 | 0 | 1 | 1 | 1 | 1 | 0 | 0 |
| Bit level 3 ($b_3$) | 0 | 0 | 0 | 0 | 1 | 1 | 1 | 1 | 1 | 1 | 1 | 1 | 0 | 0 | 0 | 0 |
| Bit level 4 ($b_4$) | 0 | 0 | 0 | 0 | 0 | 0 | 0 | 0 | 1 | 1 | 1 | 1 | 1 | 1 | 1 | 1 |
| S | 0 | 1 | 0 | 1 | 0 | 1 | 0 | 1 | 0 | 1 | 0 | 1 | 0 | 1 | 0 | 1 |

As in the case of natural labelling (Table 1), the whole 16-ASK constellation $\mathcal{X}$ may be expressed as the union of a reference sub-constellation $\mathcal{X}_r$ and a shifted version of this reference sub-constellation. The bit level 1 is used as the parity bit and enables to discriminate between the two sub-constellations. Indeed, the adjacent symbols with the same probability (according to FIG. 3) have a different value for $b_1$. Therefore, as in the case of natural labelling, the bits $b_2$, $b_3$ and $b_4$ are used to label the symbols in $\mathcal{X}_r$.

The reference sub-constellation $\mathcal{X}_r$ comprises the symbols in grey cells of the above table 2. The second sub-constellation comprises the other symbols. However, unlike with natural labelling, the rule to discriminate between the sub-constellations depends on the value of $b_2$, $b_3$ and $b_4$, more precisely on the value of a sum S. For each symbol, the sum S of its bit-levels is computed modulo 2. This sum S (last line of Table 2) is used in addition to the parity bit $b_1$ to discriminate between the two sub-constellations.

Figure 5:
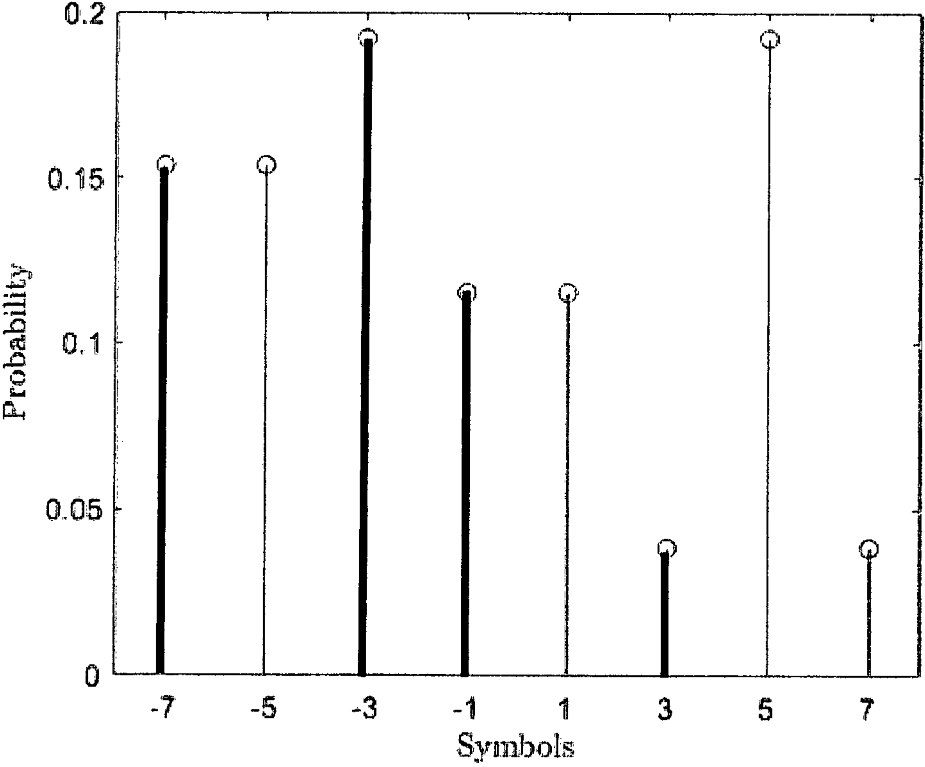
FIG. 5 depicts an example of a quantized target bit distribution of an 8-ASK constellation.

In another embodiment, the target shaping distribution is quantized such that two symbols which are not necessarily adjacent have the same probability value. In this case, the sub-constellations are not "shifts" of each other. This is the case of the distribution of an 8-ASK constellation illustrated on FIG. 5. On FIG. 5, the symbols −3 and 5 have the same probability values but are not adjacent while the symbols −7 and −5 have the same probability value and are adjacent. On this figure, the distribution of the reference sub-constellation is identified with bold lines.

For the M=8-ASK constellation, $\log_2(M)=3$ bits are required for the labelling. The labelling of the symbols in this constellation is provided by the following table 3.

TABLE 3

| Symbols | −7 | −5 | −3 | −1 | 1 | 3 | 5 | 7 |
|---|---|---|---|---|---|---|---|---|
| Bit level 1 | 0 | 1 | 0 | 0 | 1 | 0 | 1 | 1 |
| Bit level 2 | 0 | 0 | 1 | 0 | 0 | 1 | 1 | 1 |
| Bit level 3 | 0 | 0 | 0 | 1 | 1 | 1 | 0 | 1 |

The bit level 3 is the sign bit and is used as a shaping bit. The first bit level discriminates between the two sub-constellations. The symbols of same probability values have the same remaining labelling bits (bit-level 2 to 3). The reference sub-constellation $\mathcal{X}_r$ comprises the symbols in grey cells of table 3. The second sub-constellation comprises the other symbols.

The method can be extended to cases with more than two sub-constellations, wherein for any symbol in the reference sub-constellation, there is a symbol in each of the other sub-constellations with a same probability value. Given N sub-constellations, N being an integer, $\log_2(N)$ bits are required to label and thus identify each of the N sub-constellations. Consequently, there should be $\log_2(N)$ parity bits for each symbol of the reference sub-constellation in order to identify a sub-constellation to which the symbol belongs.

Figure 6:
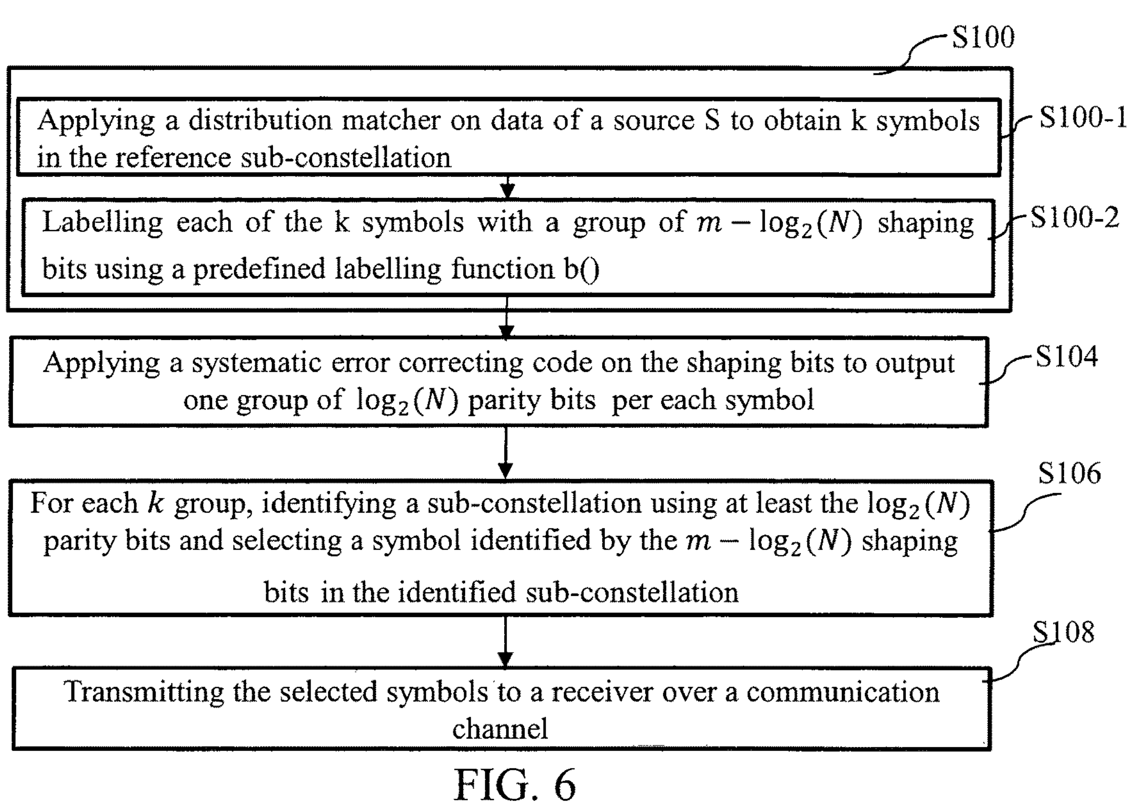
FIG. 6 depicts a method, in a transmitter, for transmitting binary data using a constellation with $M=2^m$ symbols according to a specific embodiment.

FIG. 6 depicts a method, in a transmitter, for transmitting data using a constellation with $M=2^m$ symbols according to a specific embodiment.

In a step S100, k groups of $m-\log_2(N)$ shaping bits wherein each group of $m-\log_2(N)$ shaping bits identifies one symbol in the reference sub-constellation $\mathcal{X}_r$ are obtained from a source of data S. In a specific embodiment, the source of data S is equiprobable.

In an exemplary embodiment, the k groups of $m-\log_2(N)$ bits are obtained as disclosed on FIG. 6 by using a distribution matcher in a step S100-1 to transform data of the source S into k symbols {x1, x2, . . . , xk}, where each of the k symbols is in the reference sub-constellation $\mathcal{X}_r$. The constant composition distribution matcher disclosed in the document from Schulte et al entitled "*Constant composition distribution matching*" published in IEEE Transactions on Information Theory 62(1), November 2015, is an example of such a distribution matcher. Any other arbitrary types of distribution matchers may be used. The symbols in the reference sub-constellation $\mathcal{X}_r$ are approximately distributed according to the target distribution of the reference sub-constellation $\mathcal{X}_{r_r}$. An example of such a target distribution in the case where N=2 and the constellation is the 16-ASK constellation is depicted on FIG. 7.

Each symbol xj∈{x1, x2, . . . , xk}, j being an integer in [1;k], is labelled in a step S100-2 with a group b(xj) of $m-\log_2(N)$ bits called shaping bits, where b(·) is a labelling function, e.g. a natural labelling function or a Gray labeling function. The k groups of $m-\log_2(N)$ shaping bits {b(x1), b(x2), . . . , b(xk)} which thus corresponds to the k symbols {x1, x2, . . . , xk} are used as input to a systematic error correcting code P which outputs, in a step S104, one group of $\log_2(N)$ parity bits per each symbol xj, xj being in the reference sub-constellation $\mathcal{X}_r$. An example of a systematic error correcting code is disclosed in section VII of the document from Böcherer et al entitled "*Bandwidth Efficient and Rate-Matched Low-Density Parity-Check Coded Modulation*".

In a step S106, each group of $\log_2(N)$ parity bits identifies a sub-constellation among the N sub-constellations and the symbol identified by said $m-\log_2(N)$ shaping bits in said identified sub-constellation is selected.

In a step S108, the selected symbols are finally transmitted to a receiver over a communication channel.

Figure 8A:
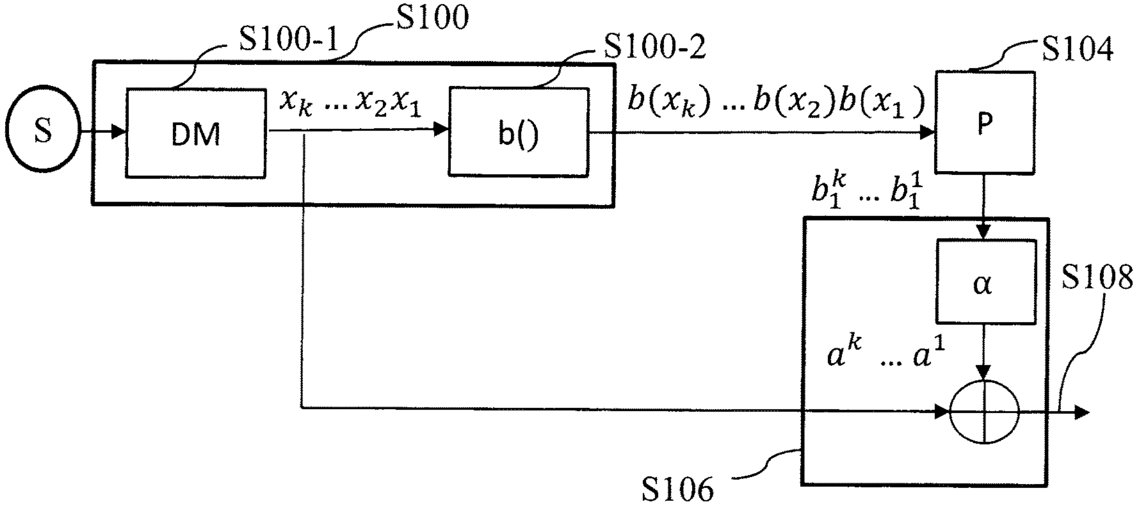
FIG. 8A depicts a method, in a transmitter, for transmitting binary data using a 16-ASK constellation defined as a union of two sub-constellations according to a specific embodiment.

FIG. 8A depicts a method, in a transmitter, for transmitting data, in the specific case where N=2 and natural labelling is used.

In the step S100, k groups of m−1 shaping bits wherein each group of m−1 shaping bits identifies one symbol in the reference sub-constellation $\mathcal{X}_r$ are obtained from a source of data S.

In an exemplary embodiment, the k groups of m−1 shaping bits are obtained as disclosed on FIG. 8A by using a distribution matcher in the step S100-1 to transform uniform data blocks of a source S into k symbols {x1, x2, . . . , xk}, where xi is in the reference sub-constellation $\mathcal{X}_r$. Any arbitrary types of distribution matchers may be used. The symbols in the reference sub-constellation $\mathcal{X}_r$ are approximately distributed according to the target distribution of the reference sub-constellation $\mathcal{X}_{r_r}$. An example of such a target distribution in the case where N=2 and the constellation is the 16-ASK constellation is depicted on FIG. 7. In this case, 3 shaping bits are obtained per symbol xj∈{x1, x2, . . . , xk}.

Each symbol xj∈{x1, x2, . . . , xk}, j being an integer in [1;k], is labelled in the step S100-2 using a natural labelling function with a group b(xj) of bits called shaping bits, namely 3 bits in case of a 16-ASK constellation. The k groups of shaping bits {b(x1), b(x2), . . . , b(xk)} corresponding to these symbols {x1, x2, . . . , xk} are used as input to a systematic error correcting code P which outputs, in the step S104, one parity bit $$b_1^j$$

per each symbol xj, xj being in the reference sub-constellation $\mathcal{X}_r$.

In the step S106, each parity bit $$b_1^j$$

determines a shift value $\alpha^j$ in the set α={0, 2} for the symbol $x_j$ of the reference sub-constellation. Thus, the parity bit $$b_1^j$$

identifies in which sub-constellation the symbol to be transmitted should be chosen. As an example, if the parity bit $$b_1^j = 0$$

then the symbol xj is from the first sub-constellation while if the parity bit $$b_1^j = 1$$

then the symbol xj is from the second sub-constellation. This is a convention and an opposite convention may be used, wherein if the parity bit $$b_1^j = 0$$

then the symbol xj is from the second sub-constellation while if the parity bit $$b_1^j = 1$$

then the symbol xj is from the first sub-constellation. The determined shift value is added to the symbol xj of the reference sub-constellation.

In the step S108, the selected symbols are finally transmitted to a receiver over a communication channel. Thus, in the case where $\alpha^j$=0, the transmitted symbol is the symbol xj the reference, and in the case where $\alpha^j$=2, the symbol in the shifted sub-constellation is transmitted.

Figure 8B:
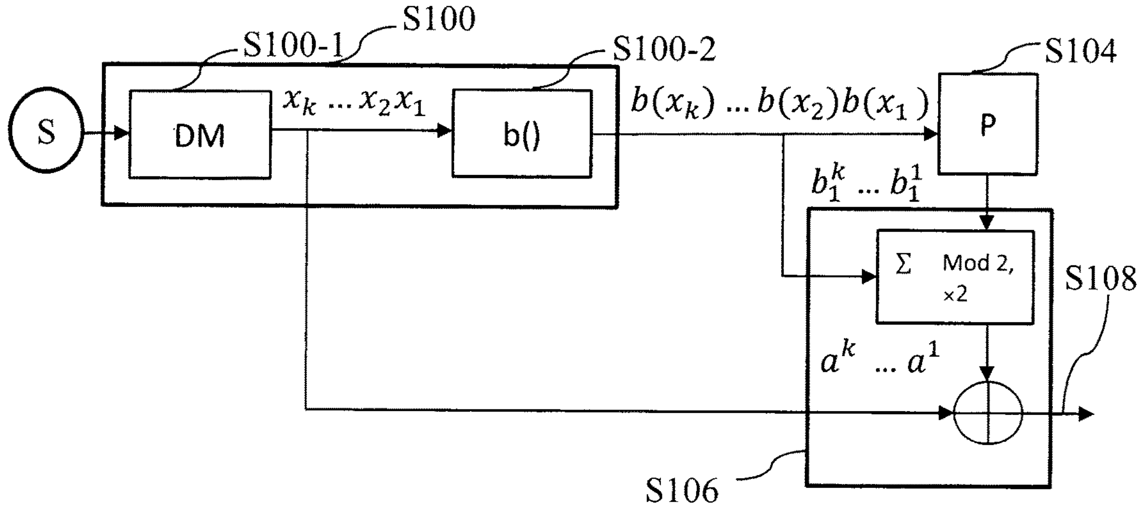
FIG. 8B depicts a method, in a transmitter, for transmitting binary data using a 16-ASK constellation defined as a union of two sub-constellations according to a specific embodiment.

FIG. 8B depicts a method, in a transmitter, for transmitting data, in the specific case where N=2 and Gray labelling is used.

In the step S100, k groups of m−1 shaping bits wherein each group of m−1 shaping bits identifies one symbol in the reference sub-constellation $\mathcal{X}_r$ are obtained from a source of data S.

In an exemplary embodiment, the k groups of m−1 shaping bits are obtained as disclosed on FIG. 8B by using a distribution matcher in the step S100-1 to transform uniform data blocks of a source S into k symbols {x1, x2, . . . , xk}, where xi is in the reference sub-constellation $\mathcal{X}_r$. Any arbitrary types of distribution matchers may be used. The symbols in the reference sub-constellation $\mathcal{X}_r$ are approximately distributed according to the target distribution of the reference sub-constellation $\mathcal{X}_{r_r}$. An example of such a target distribution in the case where N=2 and the constellation is the 16-ASK constellation is depicted on FIG. 7. In this case, 3 shaping bits are obtained per symbol xj∈{x1, x2, . . . , xk}.

Each symbol xj∈{x1, x2, . . . , xk}, j being an integer in [1;k], is labelled in the step S100-2 using a Gray labelling function with a group $b(x_j)$ of bits called shaping bits, namely 3 bits in case of a 16-ASK constellation. The k groups of shaping bits {b(x1), b(x2), . . . , b(xk)} corresponding to these symbols {x1, x2, . . . , xk} are used as input to a systematic error correcting code P which outputs, in the step S104, one parity bit $$b_1^j$$

per each symbol xj, xj being in the reference sub-constellation $\mathcal{X}_y$.

In the step S106, for each parity bit $$b_1^j,$$

a sum Sj of the parity bit $$b_1^j$$

and of the associated shaping bits b(xj) is computed modulo 2, i.e.

$$Sj = MOD\left(\sum_{n=1}^{m} b_n^j, 2\right),$$

where the shaping bits $$b(xj) = \{b_2^j b_3^j \ldots , b_m^j\}.$$

Double the sum Sj is the shift value $\alpha^j$ in the set $\alpha=\{0, 2\}$ for the symbol xj of the reference sub-constellation, i.e. $\alpha_j=2*Sj$. The determined shift value is added to the symbol $x_j$ of the reference sub-constellation. Thus, in the case where $\alpha^j=0$, the transmitted symbol is the symbol $x_j$ the reference, and in the case where $\alpha^j=2$, the symbol in the shifted sub-constellation is transmitted.

In the step S108, the selected symbols are finally transmitted to a receiver over a communication channel.

In the embodiments disclosed with respect to FIGS. 6, 8A and 8B, the parity bit is used to identify one sub-constellation among the sub-constellations whose union form the main constellation, e.g. a 16-ASK constellation. Consequently, the sign bit is available for the shaping operation. Therefore, sign-bit shaping can be advantageously combined with systematic error-correcting code as depicted on FIGS. 9A and 9B.

Figure 9A:
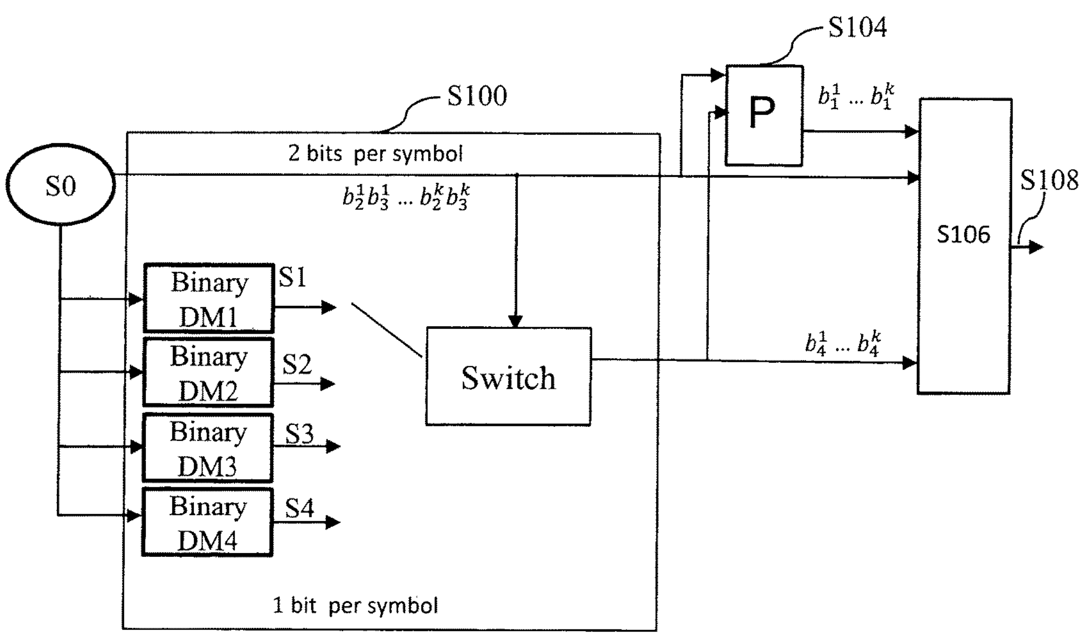
FIG. 9A depicts a method, in a transmitter, for transmitting binary data using a 16-ASK constellation defined as a union of two sub-constellations according to a specific embodiment.

FIG. 9A depicts a method, in a transmitter, for transmitting binary data, in the specific case where a 16-ASK constellation is considered and N=2 according to another embodiment. In this embodiment, natural labelling is used.

Figure 7:
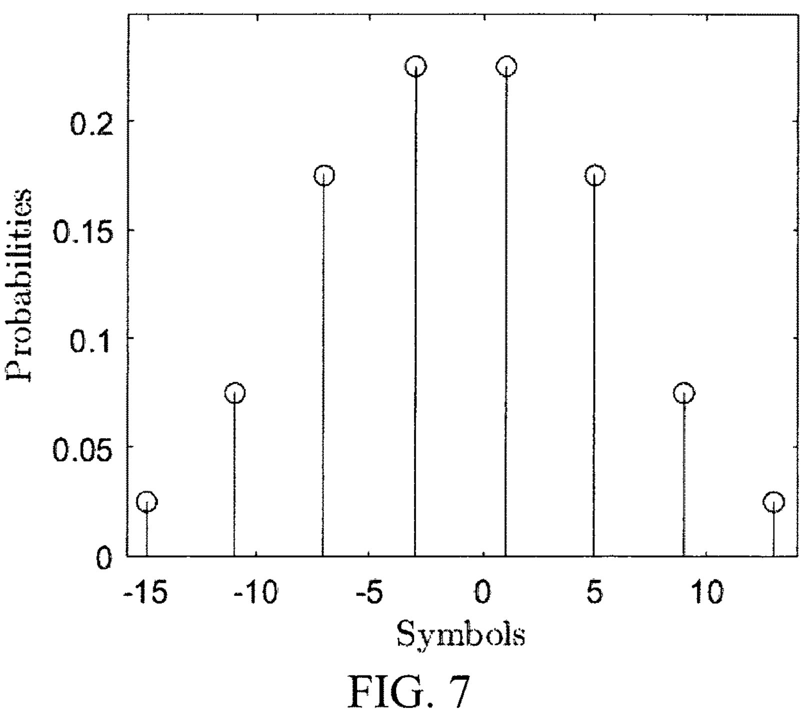
FIG. 7 depicts an example of a target distribution of a reference sub-constellation in the case of a 16-ASK constellation according to one embodiment.

The target distribution depicted on FIG. 7 can be realized as shown on FIG. 9A.

In the step S100, k groups of 3 shaping bits $$b_2^j b_3^j b_4^j$$

wherein each group identifies one symbol xj in the reference sub-constellation $\mathcal{X}_r$ are obtained from a source of data S0. In one specific embodiment, the second and third bit levels in table 1, i.e.

$$b_2^j b_3^j,$$

are equiprobable and independent. Therefore, these two bits $$b_2^j b_3^j$$

are obtained from a binary source $S_0$. The output of the source S0 is used as input of four binary DMs, namely DM1, DM2, DM3 and DM4. These binary DMs output four sequences of bits identified as four binary non-equiprobable sources $S_1$, $S_2$, $S_3$ and $S_4$. The probability of the last bit level, i.e. the sign bit $$b_4^j,$$

is chosen based on the value of $$b_2^j b_3^j,$$

i.e.

$$p(b_4^j \mid b_2^j b_3^j),$$

and is independent of the value of $$b_1^j.$$

Consequently, a switch selects a given non-equiprobable source ($S_1$, $S_2$, $S_3$ or $S_4$) based on the values of $$b_2^j$$

and $$b_3^j.$$

Figure 10A:
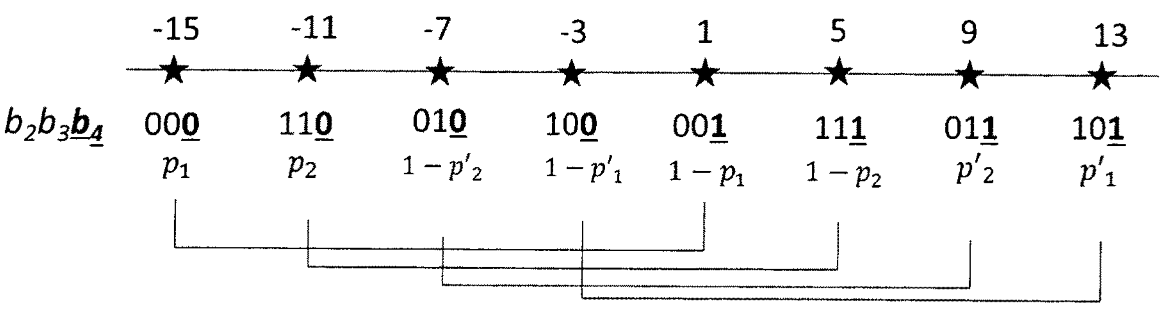
FIG. 10A depicts for a reference sub-constellation of a 16-ASK constellation and the probabilities of the last bit level according to a specific embodiment.

The different values for $$(b_4^j \mid b_2^j b_3^j)$$

are depicted on FIG. 10A.

On FIG. 10A, the parameters pi represent the probabilities of the last bit level $$b_4^j$$

conditioned on the values of $$b_2^j$$

and $$b_3^j.$$

In the specific case of a symmetric target distribution (in the case of a Gaussian channel), i.e. p1'=p1 and p2'=p2, the number of non-equiprobable sources is divided by two and thus the switch selects a given non-equiprobable source ($S_1$ or $S_2$) based on the value of $$b_2^j,$$

e.g. $S_1$ is selected in the case where $$b_2^j = 0$$

and $S_2$ is selected otherwise.

Taking into account this symmetry, the shaping encoder is simplified with the number of binary sources being divided by two and bit flipping being used. This shaping method is disclosed in the patent application EP21305730.0 filed on Jun. 1, 2021.

The k groups of shaping bits $$\{b_2^j b_3^j b_4^j\}_{j\in[1;k]}$$

corresponding to the symbols {x1, x2, . . . , xk} are used as input to a systematic error correcting code P which outputs, in the step S104, one parity bit $$b_1^j$$

per each symbol xj, xj being in the reference sub-constellation $\mathcal{X}_r$.

In the step S106, each parity bit identifies a sub-constellation among the N sub-constellations and the symbol identified by said $$\{b_2^j b_3^j b_4^j\}$$

shaping bits in said identified sub-constellation is selected.

In the step S108, the selected symbols are finally transmitted to a receiver over a communication channel.

Figure 9B:
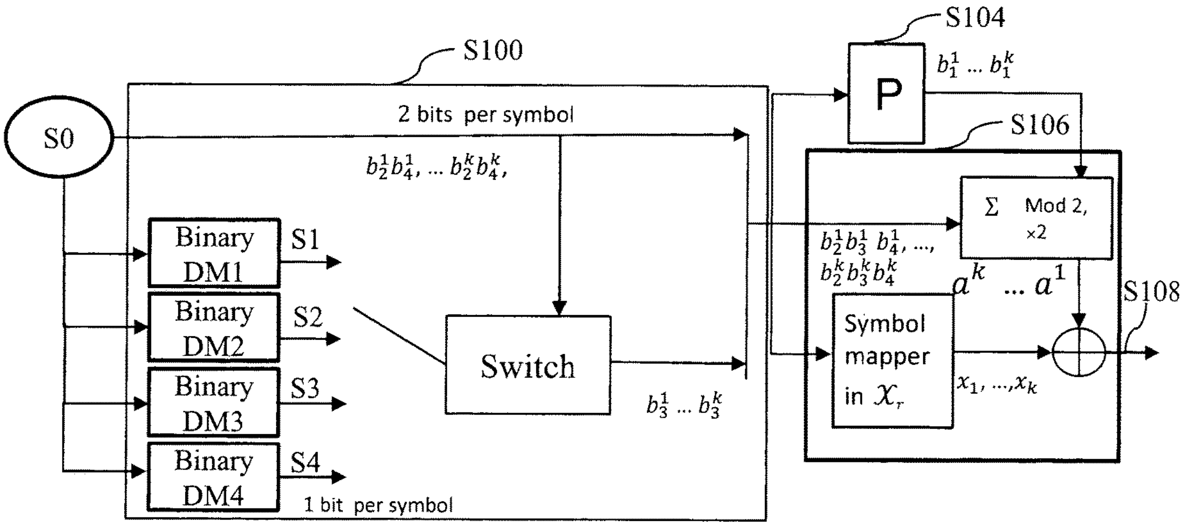
FIG. 9B depicts a method, in a transmitter, for transmitting binary data using a 16-ASK constellation defined as a union of two sub-constellations according to a specific embodiment.

FIG. 9B depicts a method, in a transmitter, for transmitting binary data, in the specific case where a 16-ASK constellation is considered and N=2 according to another embodiment. In this embodiment, Gray labelling is used.

The target distribution depicted on FIG. 7 can be realized as shown on FIG. 9B.

In the step S100, k groups of 3 shaping bits $$b_2^j b_3^j b_4^j$$

wherein each group identifies one symbol xj in the reference sub-constellation $\mathcal{N}_r$ are obtained from a source of data S0. In one specific embodiment, the second and fourth bit levels in table 2, i.e.

$$b_2^j b_4^j,$$

are equiprobable and independent. Therefore, these two bits $$b_2^j b_4^j$$

are obtained from a binary source $S_0$. The output of the source S0 is used as input of four binary DMs, namely DM1, DM2, DM3 and DM4. These binary DMs output four sequences of bits identified as four binary non-equiprobable sources $S_1$, $S_2$, $S_3$ and $S_4$. The probability of the third bit level, i.e. the bit $$b_3^j,$$

is chosen based on the values of $$b_2^j$$

and $$b_4^j,$$

i.e.

$$p(b_3^j|b_2^j b_4^j),$$

and is independent of the value of $$b_1^j.$$

Consequently, a switch selects a given non-equiprobable source ($S_1$, $S_2$, $S_3$ or $S_4$) based on the value of $$b_2^j$$

and $$b_4^j.$$

Figure 10B:
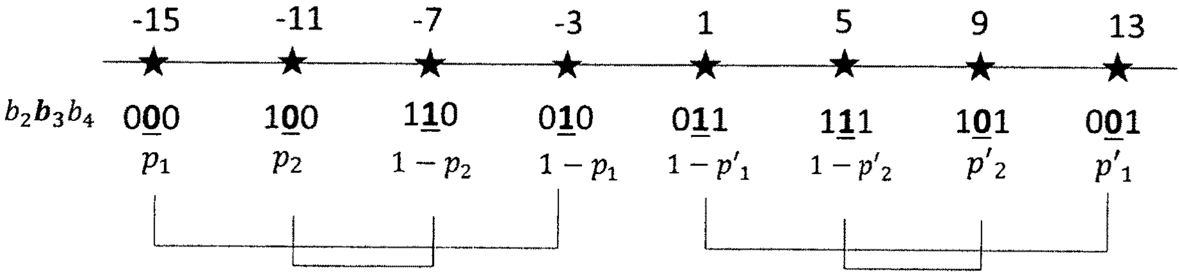
FIG. 10B depicts for a reference sub-constellation of a 16-ASK constellation and the probabilities of the last bit level according to a specific embodiment.

The different values for $$p(b_3^j|b_2^j b_4^j)$$

are depicted on FIG. 10B. On FIG. 10B, the parameters pi represent the probabilities of the third bit level $$b_3^j$$

conditioned on the values of $$b_2^j$$

and $$b_4^j.$$

In the specific case where p1'=p1 and p2'=p2, then $$p(b_3^j|b_2^j b_4^j) = p(b_3^j|b_2^j).$$

In this case, the number of non-equiprobable sources is divided by two and thus the switch selects a given non-equiprobable source ($S_1$ or $S_2$) based on the value of $$b_2^j,$$

e.g. $S_1$ is selected in the case where $$b_2^j = 0$$

and $S_2$ is selected otherwise.

The k groups of shaping bits $$\{b_2^j b_3^j b_4^j\}_{j\in[1;k]}$$

corresponding to the symbols {x1, x2, . . . , xk} are used as input to a systematic error correcting code P which outputs, in the step S104, one parity bit $$b_1^j$$

per each symbol xj, xj being in the reference sub-constellation $\mathcal{X}_r$.

In the step S106, for each parity bit $$b_1^j,$$

a sum Sj of the parity bit $$b_1^j$$

and of the associated shaping bits b(xj) is computed modulo 2, i.e.

$$Sj = MOD\left(\sum\nolimits_{n=1}^{4} b_n^j, 2\right).$$

Double the sum Sj is the shift value $\alpha^j$ in the set α={0, 2} for the symbol xj of the reference sub-constellation, i.e. $\alpha^j$=2*Sj. The determined shift value is added to the symbol xj of the reference sub-constellation obtained by mapping the shaping bits $$\{b_2^j b_3^j b_4^j\}$$

to a symbol xj in the reference sub-constellation. Thus, in the case where $\alpha^j$=0, the transmitted symbol is the symbol xj the reference, and in the case where $\alpha^j$=2, the symbol in the shifted sub-constellation is transmitted.

In the step S108, the selected symbols are finally transmitted to a receiver over a communication channel.

Figure 11:
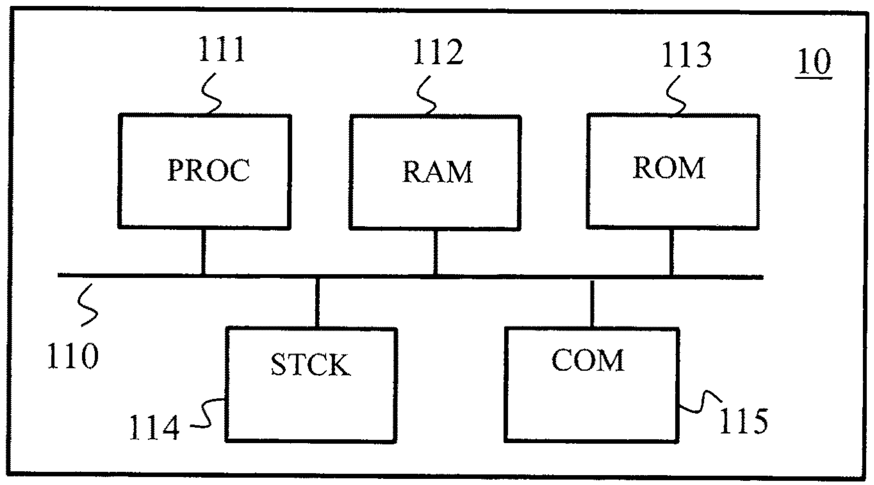
FIG. 11 illustrates schematically an example of hardware architecture of a transmitter according to a specific embodiment.

FIG. 11 illustrates schematically an example of hardware architecture of a transmitter 10 according to a specific embodiment.

The transmitter 10 comprises, connected by a communication bus 110: a processor or CPU (acronym of "Central Processing Unit") 111; a random access memory RAM 112; a read only memory ROM 113; a storage unit 114 such as an hard disk or such as a storage medium reader, e.g. a SD (acronym of "Secure Digital") card reader; and at least one set of communication interfaces COM 115 enabling the transmitter 10 to transmit and receive data.

The processor 111 is capable of executing instructions loaded into the RAM 112 from the ROM 113, from an external memory (such as an SD card), from a storage medium (such as the HDD), or from a communication network. When the transmitter 10 is powered up, the processor 111 is capable of reading instructions from the RAM 112 and executing them. These instructions form a computer program causing the implementation, by the processor 111, of the methods described in relation to FIGS. 6, 8 and 9.

The methods described in relation to FIGS. 6, 8 and 9 may be implemented in software form by the execution of the set of instructions by a programmable machine, for example a DSP (acronym of "Digital Signal Processor"), a microcontroller or a GPU (acronym of "Graphics Processing Unit"), or be implemented in hardware form by a machine or a dedicated component (chip or chipset), for example an FPGA (acronym of "Field-Programmable Gate Array") or an ASIC (acronym of "Application-Specific Integrated Circuit"). In general, the transmitter 10 includes electronic circuitry adapted and configured for implementing the methods described in relation to FIGS. 6, 8 and 9.

The invention claimed is:

1. A method, in a transmitter, for transmitting data using a constellation with $M=2^m$ symbols, said constellation having a quantized target shaping distribution expressed as the union of N sub-constellations, N and M being integers, where for any symbol in a reference sub-constellation belonging to the N sub-constellations, there is a symbol in each of the other sub-constellations of the N sub-constellations with a same probability value, and each other sub-constellations being a shifted version of said reference sub-constellation comprising:

obtaining from a source of data, k groups of $m-\log_2(N)$ shaping bits wherein each group of $m-\log_2(N)$ shaping bits identifies one symbol $x_j$ in the reference sub-constellation, j∈[1;k];

inputting the k groups of $m-\log_2(N)$ shaping bits to a systematic error correcting code to output one group of $\log_2(N)$ parity bits per each symbol $x_j$;

for each symbol $x_j$, identifying a sub-constellation using at least the group of $\log_2(N)$ parity bits and selecting a symbol identified by said $m-\log_2(N)$ shaping bits in said identified sub-constellation; and transmitting each of said k selected symbols to a receiver over a communication channel, compliant with distribution matchers that consider the sign bits as shaping bits or adapted to non-symmetric distributions.

2. The method according to claim 1, wherein obtaining from a source of data, k groups of $m-\log_2(N)$ shaping bits wherein each group of $m-\log_2(N)$ shaping bits identifies one symbol $x_j$ in the reference sub-constellation, j∈[1;k] comprises:

Applying a distribution matcher on said data of said source to obtain k symbols $x_j$ in the reference sub-constellation; and Labelling each symbol with a group of $m-\log_2(N)$ shaping bits using a labelling function.

3. The method according to claim 2, wherein the labelling function is a natural labelling function.

4. The method according to claim 2, wherein the labelling function is a Gray labelling function.

5. The method according to claim 1, wherein N=2 and wherein for each symbol $x_j$, identifying a sub-constellation using at least the group of $\log_2(N)$ parity bits and selecting a symbol identified by said $m-\log_2(N)$ shaping bits in said identified sub-constellation comprises: selecting a shift value in the set {0; 2} responsive to at least the group of $\log_2(N)$ parity bits and adding the selected shift value to the symbol $x_j$ of the reference sub-constellation to obtain the symbol to transmit.

6. The method according to claim 5, wherein selecting a shift value in the set {0; 2} responsive to at least the group of $\log_2(N)$ parity bits comprises selecting a shift value responsive to double a sum modulo 2 of the group of $\log_2(N)$ parity bits and of the corresponding $m-\log_2(N)$ shaping bits.

7. The method according to claim 1, wherein the constellation is an M-ASK constellation.

8. The method according to claim 1, wherein said source of data is an equiprobable source.

9. A transmitter configured to transmit data using a constellation with $M=2^m$ symbols, said constellation having a quantized target shaping distribution expressed as the union of N sub-constellations, N and M being integers, where for any symbol in a reference sub-constellation belonging to the N sub-constellations, there is a symbol in each of the other sub-constellations of the N sub-constellations with a same probability value, and each other sub-constellations being a shifted version of said reference sub-constellation, the transmitter comprises at least one processor configured to:

obtain from a source of data, k groups of $m-\log_2(N)$ shaping bits wherein each group of $m-\log_2(N)$ shaping bits identifies one symbol $x_j$ in the reference sub-constellation, $j\in[1;k]$;

input the k groups of $m-\log_2(N)$ shaping bits to a systematic error correcting code to output one group of $\log_2(N)$ parity bits per each symbol $x_j$;

for each symbol $x_j$, identify a sub-constellation using at least the group of $\log_2(N)$ parity bits and select a symbol identified by said $m-\log_2(N)$ shaping bits in said identified sub-constellation; and transmit each of said k selected symbols to a receiver over a communication channel, compliant with distribution matchers that consider the sign bits as shaping bits or adapted to non-symmetric distributions.

10. The transmitter according to claim 9, wherein to obtain from a source of data, k groups of $m-\log_2(N)$ shaping bits wherein each group of $m-\log_2(N)$ shaping bits identifies one symbol $x_j$ in the reference sub-constellation, $j\in[1;k]$ comprises:

to apply a distribution matcher on said data of said source to obtain k symbols $x_j$ in the reference sub-constellation; and to label each symbol with a group of $m-\log_2(N)$ shaping bits using a labelling function.

11. The transmitter according to claim 10, wherein the labelling function is a natural labelling function.

12. The transmitter according to claim 10, wherein the labelling function is a Gray labelling function.

13. The transmitter according to claim 9, wherein N=2 and wherein for each symbol $x_j$, to identify a sub-constellation using at least the group of $\log_2(N)$ parity bits and to select a symbol identified by said $m-\log_2(N)$ shaping bits in said identified sub-constellation comprises: to select a shift value in the set {0; 2} responsive to at least the group of $\log_2(N)$ parity bits and to add the selected shift value to the symbol xj of the reference sub-constellation to obtain the symbol to transmit.

14. The transmitter according to claim 13, wherein to select a shift value in the set {0; 2} responsive to at least the group of $\log_2(N)$ parity bits comprises to select a shift value responsive to double a sum modulo 2 of the group of $\log_2(N)$ parity bits and of the corresponding $m-\log_2(N)$ shaping bits.

15. A computer program product comprising program code instructions that can be loaded in a programmable device, the program code instructions causing implementation of the method according to claim 1 when the program code instructions are run by the programmable device.

16. A storage medium storing a computer program comprising program code instructions, the program code instructions causing implementation of the method according to claim 1 when the program code instructions are read from the storage medium and run by a programmable device.

* * * * *